United States Patent [19]
Baldwin et al.

[11] Patent Number: 5,465,127
[45] Date of Patent: Nov. 7, 1995

[54] OVERHEAD PROJECTOR WITH VIBRATION CONTROL HEAD

[75] Inventors: Dwight G. Baldwin; Xiaowei Zhao; Mike E. Darland, both of Austin; Ernesto M. Rodriguez, Round Rock, all of Tex.

[73] Assignee: Minnesota Mining and Manufacturing Company, St. Paul, Minn.

[21] Appl. No.: 401,311

[22] Filed: Mar. 15, 1995

[51] Int. Cl.⁶ .................................. G03B 21/132
[52] U.S. Cl. ........................ 353/119; 353/DIG. 6
[58] Field of Search ............... 353/119, 63, 65, 353/DIG. 3, DIG. 4, DIG. 6

[56] References Cited

U.S. PATENT DOCUMENTS

| | | | |
|---|---|---|---|
| 4,634,246 | 1/1987 | Dreyer, Jr. | 353/DIG. 6 |
| 4,944,578 | 7/1990 | Denison | 353/122 |
| 4,950,072 | 8/1990 | Honda | 353/122 |
| 4,986,651 | 1/1991 | Vauderwerf | 353/66 |
| 5,120,125 | 6/1992 | Behs | 353/102 |
| 5,135,301 | 8/1992 | Dreyer, Jr. et al. | 353/85 |
| 5,241,333 | 8/1993 | Rodriguez et al. | 353/87 |
| 5,245,370 | 9/1993 | Peterson | 353/122 |

FOREIGN PATENT DOCUMENTS

| | | | |
|---|---|---|---|
| 3010497 | 9/1981 | Germany | 353/DIG. 6 |
| 6-95247 | 4/1994 | Japan | 353/63 |
| 6-95249 | 4/1994 | Japan | 353/63 |

*Primary Examiner*—William A. Cuchlinski, Jr.
*Assistant Examiner*—William C. Dowling
*Attorney, Agent, or Firm*—Arnold White & Durkee

[57] ABSTRACT

An improved overhead projector head is provided that reduces the vibration that can occur in an overhead projector head that is used to project images from an LCD panel placed on the stage of the projector. The improvements comprise adding a mounting plate between the support arm and the head bracket. The mounting plate is cantilevered from the support arm, and the head bracket is supported by spacers placed near the end of the mounting plate that is remote from the support arm. In alternative embodiments, the head bracket may be divided into two pieces separated by foam or other vibration damping material, or a conterweight may be added to the head assembly behind the support arm.

16 Claims, 5 Drawing Sheets

OVERHEAD PROJECTOR WITH VIBRATION CONTROL HEAD

FIELD OF THE INVENTION

The present invention relates generally to overhead projectors, and more specifically to overhead projectors that are used to transmit images from liquid crystal display panels. In particular, the invention relates to improvements in overhead projection heads to reduce vibration and blurring of the projected image.

BACKGROUND OF THE INVENTION

Overhead projectors of the transmissive type include a base unit which encloses a light source and lenses for suitably focussing light from the source and a transparent stage upon which may be positioned a transparency or other film having indicia which is to be projected on a distant screen. Above the base is disposed a projection head having lenses and a mirror which function to gather light from the projector base and redirect it to the screen. The projection head is supported by a post or arm extending upwardly from the base.

In typical prior art overhead projectors, as shown in FIG. 1, the primary structural member of the projection head assembly, the head bracket, is attached directly to the arm in a cantilevered fashion by screws positioned near the rear edge of the head bracket. The head bracket supports the projection lens and the mirror, as well as a head cover.

The technical problem addressed by this invention is the occurrence of undesirable vibration in the head of an overhead projector, such as when the projector is used with a liquid crystal display (LCD) panel. A LCD panel is used to allow projection of a computer generated image with an overhead projector. With some overhead projectors the cooling fan of the LCD panel causes an unacceptable resonant vibration of the projection head of the overhead projector. This vibration of the head, and particularly the mirror in the head, causes unacceptable smearing or blurring of the projected image.

SUMMARY OF THE INVENTION

The present invention provides an improved projector head for an overhead projector, and particularly for an overhead projector that is used to project an image from an LCD panel. The improvement made to the projector head changes the resonant modes of the head so as to remove them from the driving frequencies generated by fans in the projector and in the LCD panel.

In a presently preferred embodiment, the improvement comprises the addition of a mounting plate that is positioned between the head bracket and the head support arm. The mounting plate is attached to the arm in a cantilevered fashion, such as by screws located near the rear edge of the mounting plate. The head bracket is attached to the mounting plate at a location spaced from the rear edge of the mounting plate. The location of attachment between the mounting plate and the head bracket may be near the front edge of the mounting plate and near the centerline of the head bracket. The location of attachment between the mounting plate and the head bracket may be at other positions on each component as well.

In alternative embodiments, the benefits of the invention may be realized by splitting the head bracket into a lens bracket and a separate mirror bracket, and attaching those two brackets to one another in a semi-rigid manner. An energy absorbing material may be placed between the lens bracket and the mirror bracket to de-couple the mirror assembly from the remainder of the overhead projector. Such a split-head assembly may be used by itself, or it may be used in conjunction with the mounting plate described in the preceding paragraph.

The present invention therefore provides an improved overhead projector head assembly which eliminates or reduces the occurrence of unacceptable vibration of the projection mirror and consequent blurring of the projected image. These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

DESCRIPTION OF PREFERRED EMBODIMENTS

Figure 1:
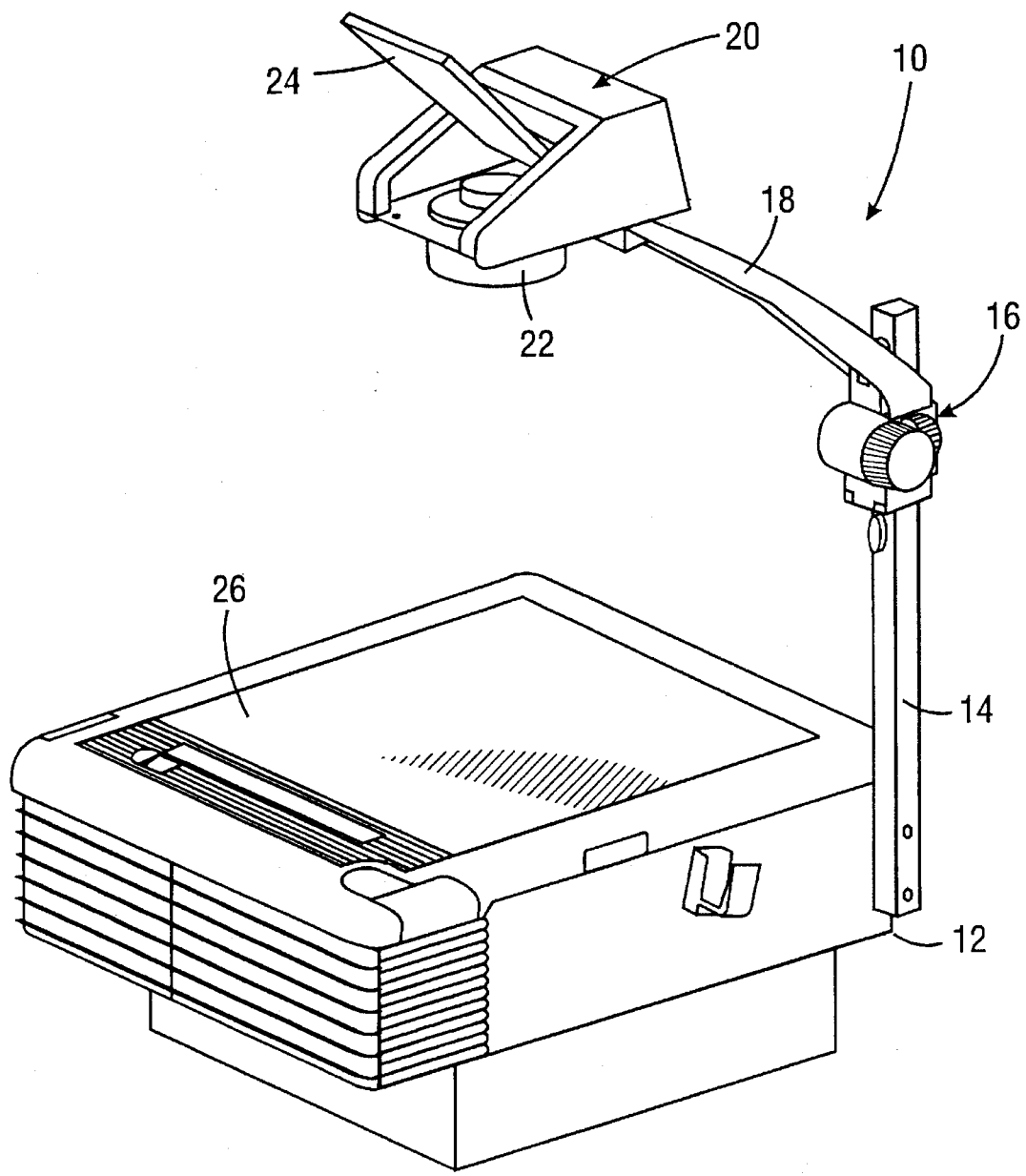
FIG. 1 is a perspective view of a typical transmissive overhead projector as is known in the prior art.

FIG. 1 illustrates a typical transmissive type overhead projector, generally indicated as 10, which includes as major elements a base 12, an upright post 14 extending from the base 12, an adjustment mechanism 16 attached to the post 14 and a focus arm 18 extending from the adjustment mechanism 16 to support a projection head 20. The projection head 20 includes a lens or plurality of lenses 22 and a mirror 24 and is supported so that the lens 22 is positioned over a transparent stage 26.

The base 12 of the projector 10 houses a light source, mirrors and lenses which direct light through the stage 26 and an imaging film such as a transparency located thereon and focus that light at the lens 22 of the projection head 20. The light passing through the projection head lens 22 is redirected by the mirror 24 to a distant vertical surface which is or serves as a screen for the projected image.

A computer driven imaging display device, such as a liquid crystal display (LCD) panel, may be used to provide the image to be projected, rather than an imaging film or transparency. The LCD panel is used by positioning it on stage 26 in place of a transparency. LCD panels suitable for this application typically include cooling fans that can induce vibration into the overhead projector system. In some combinations of overhead projectors and LCD panels, it has been observed that unacceptable smearing or blurring of the projected image occurs. That problem has been identified as being caused by the existence of a resonant mode in the projection head corresponding to a vibration frequency generated by a typical LCD display fan. Vibration frequencies can also be generated by the overhead projector fan and interactions between the overhead projector fan, the LCD panel fan and other sources.

Figure 2:
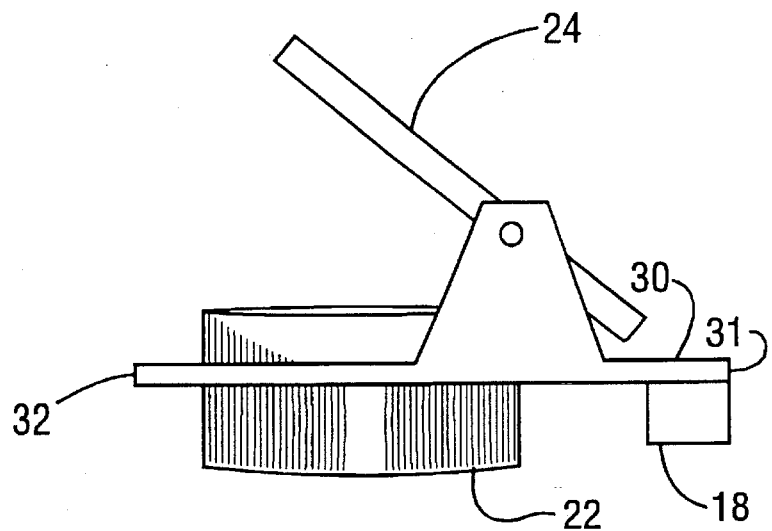
FIG. 2 is a elevation view from the side of a projection head of a typical overhead projector showing the relationship of the arm, head bracket, mirror and projection lens as are known in the prior art.

FIG. 2 illustrates a prior art projection head structure. This drawing is intended to represent a typical arrangement of components, but it is particularly representative of some typical projection heads as are known in the prior art. The components of the projection head are assembled on head bracket 30 which has front end 32 and rear end 31. Head bracket 30 is attached to support arm 18 in a cantilevered fashion near rear edge 31. Head bracket 30 typically supports projection lens 22 and projection mirror 24, as well as a head cover (not shown).

When the arrangement shown in FIG. 2 is used, it is suspended above the stage of the overhead projector. Light from the stage, which may have passed through a LCD display panel, is received through projection lens 22 and reflected from mirror 24 in a forward direction toward a screen on which the image is to be displayed. It will be apparent to one skilled in the art that any vibration of mirror 24 will adversely affect the resolution and clarity of the projected image.

Figure 3:
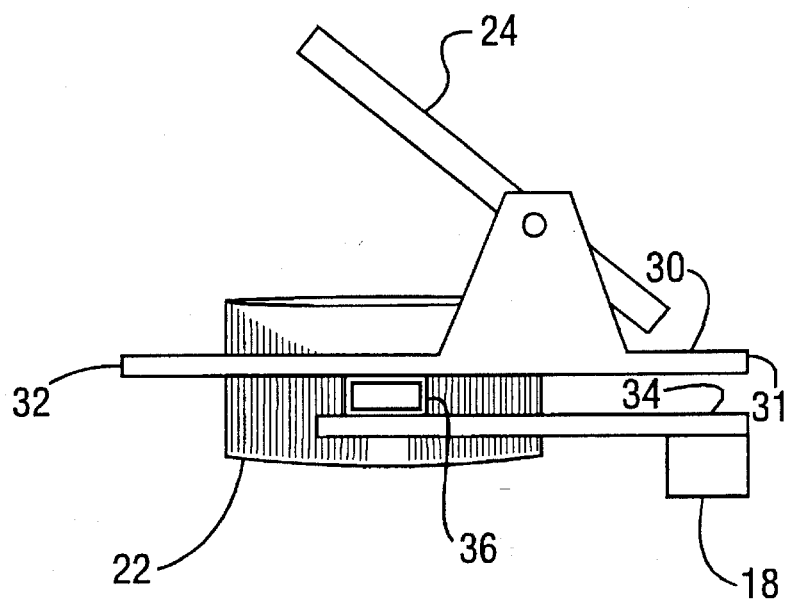
FIG. 3 shows a elevation view from the side of a projection head including a preferred embodiment of the present invention.

Referring to FIG. 3, a preferred embodiment of the present invention is illustrated wherein the head bracket 30 as shown in FIG. 2 is connected to arm 18 via mounting plate 34 and spacer 36. In this preferred embodiment, mounting plate 34 is attached to arm 18 in a cantilevered fashion. Mounting plate 34 is generally horizontally disposed. Head bracket 30 is attached to and supported by mounting plate 34. The point of attachment between mounting plate 34 and head bracket 30 is spaced from arm 18. In preferred embodiments, mounting plate 34 and head bracket 32 are attached at two locations, one on each lateral side of projection lens 22. A line connecting those two points of attachment may approximate a center of balance of projection head assembly including head bracket 30, projection lens 22 and mirror 24. That centerline may be approximated by centering it on the lens, or by selecting a centerline approximately midway between the front and rear edges of the head bracket. Spacer 36 may comprise a rigid material such as aluminum or other metal or plastic, or it may comprise a resilient material such as rubber, soft plastic or a foam material.

Figure 4:
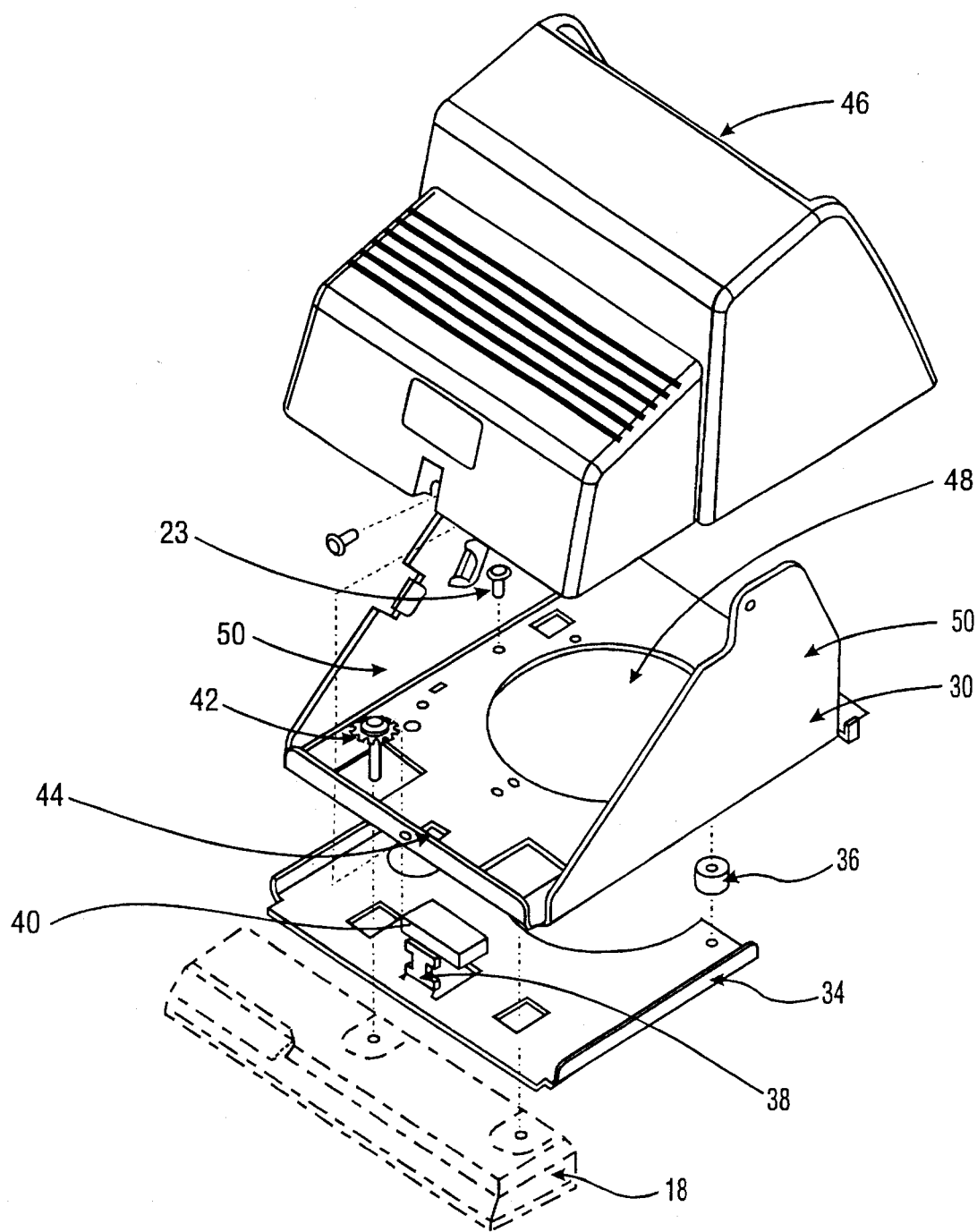
FIG. 4 is an exploded perspective view of a projection head including the improvements provided by the present invention.

FIG. 4 provides an exploded view of a presently preferred embodiment of the present invention. Mounting plate 34 is attached to arm 18 by screws 42. Head bracket 30 is attached to mounting plate 34 at a location spaced from arm 18. Fastener 23, which may be a screw, rivet or equivalent, passes through holes in head bracket 30, spacer 36, and mounting plate 34. In this embodiment, there is a spacer 36 and fastener 23 on each side of the lens.

A travel limiting tab 38 may be formed in mounting plate 34 for engagement with slot 44 formed in head bracket 30. Dampening pad 40 may also be placed between mounting plate 34 and head bracket 30 in the vicinity of travel limiting tab 38. Travel limiting tab 38 and dampening pad 40 cooperate to restrict and dampen any relative motion of head bracket 30 with respect to mounting plate 34, particularly to reduce the settling time of any impact-induced transient vibrations, such as when the projector is bumped by the user.

Projection lens (not shown) is suspended within orifice 48 of head bracket 30, and the projection mirror (not shown) is supported by the vertical panel portions 50 of head bracket 30. Head cover 46 is also attached to head bracket 30.

In presently preferred emobidments, spacer 36 is made of aluminum and dampening pad 40 consists of a small block of a shock absorbing or dampening material, which may be E-A-R ISOLOSS® "LS" high density cellular urethane foam.

Figure 5:
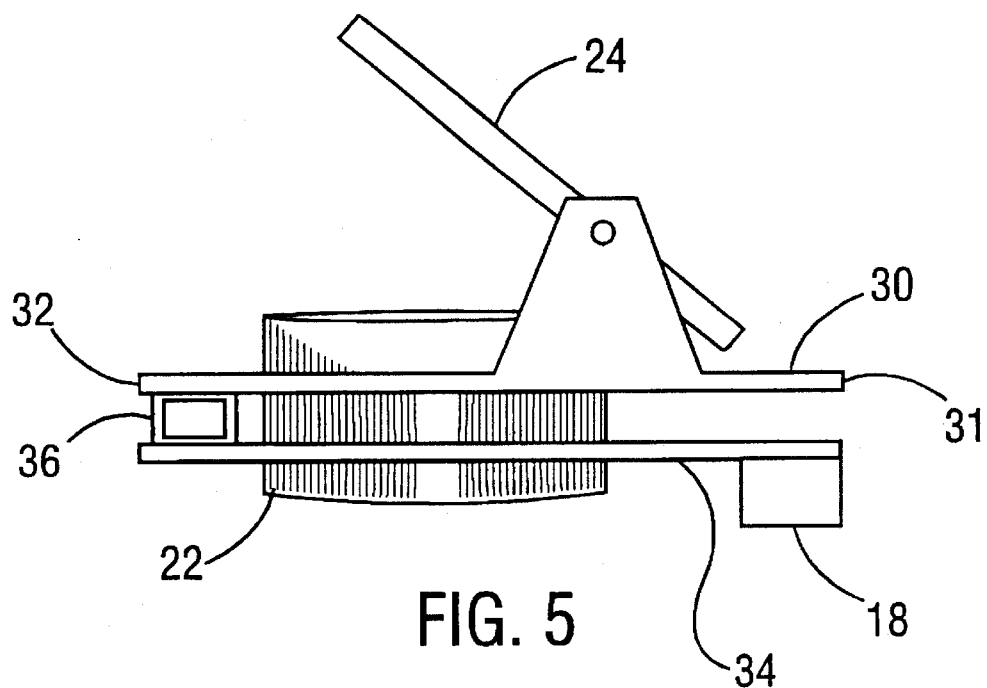
FIG. 5 shows a side elevation view of an alternative embodiment of the improvement of the present invention.

FIG. 5 illustrates an alternative embodiment of the present invention. FIG. 5 is similar in most respects to FIG. 3, except that mounting plate 34 is substantially longer, extending as far forward as the front edge 32 of head bracket 30. The point of attachment between mounting plate 34 and head bracket 30 is near the front edge of both components, with spacers positioned between the mounting plate 34 and head bracket 30 to separate them from one another. Head bracket 30 is thus cantilevered back in a rearward direction from spacer 36. One or more travel limiting tabs and/or dampening pads, as described above, may be employed in this embodiment between mounting plate 34 and head bracket 30.

Figure 6:
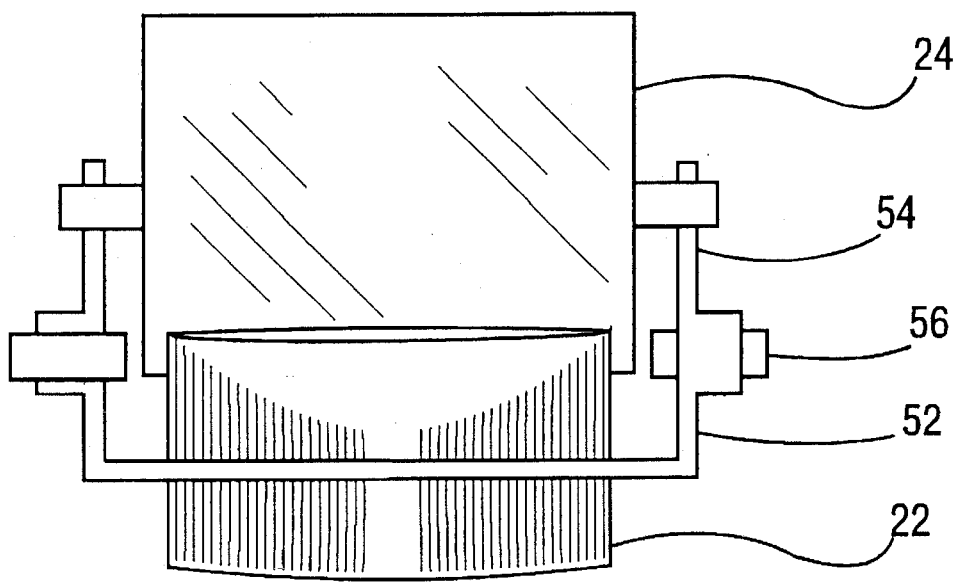
FIG. 6 is a from elevation view of an alternative embodiment of the present invention.
Figure 7:
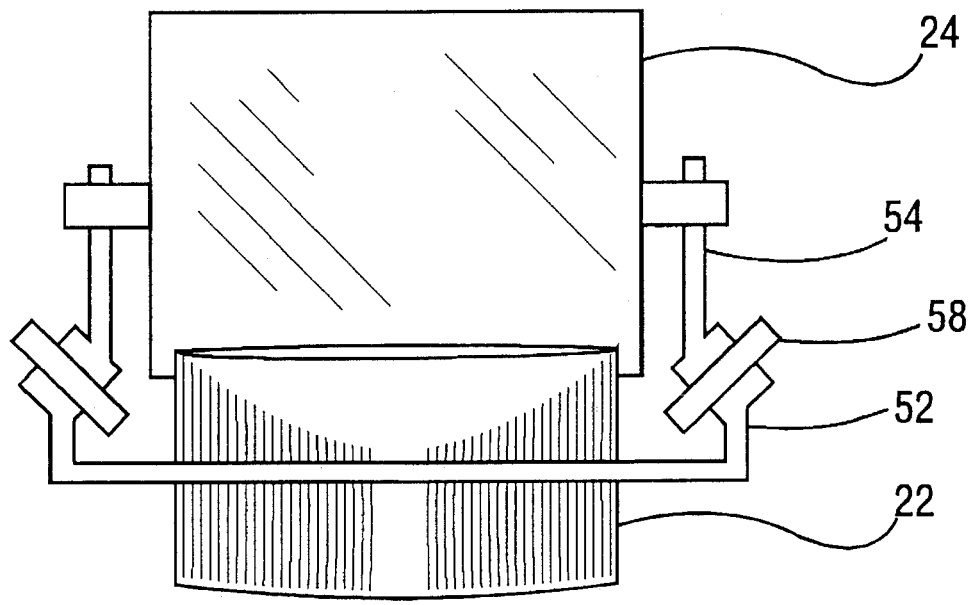
FIG. 7 is a front elevation of another alternative embodiment of the present invention.

FIGS. 6 and 7 illustrate further alternative embodiments of the present invention. Both of these figures show views from the front of the projector of lens 22 and mirror 24 supported by structures that isolate the mirror from the lens. Head bracket 52 supports lens 22 and is directly or indirectly attached to the projector arm (not shown). Mirror bracket 54 supports mirror 24. Mirror bracket 54 is attached to head bracket 52 through dampening material 56. This dampening material inhibits the transfer of vibrational energy from the overhead projector to mirror 24. Mirror bracket 54 and head bracket 52 may be joined together with screws, rivets or similar fasteners with dampening material 56 in the form of a washer or similar insert. Alternatively, the mirror bracket 54 and head bracket 52 may each be attached to dampening material 56 by adhesive or other means. The embodiment of FIG. 7 is similar to the embodiment shown in FIG. 6 except that dampening material 58 is disposed in a slanted position rather than in a horizontal position. Mirror bracket 54 and head bracket 52 are correspondingly altered as shown in the figure.

Figure 8:
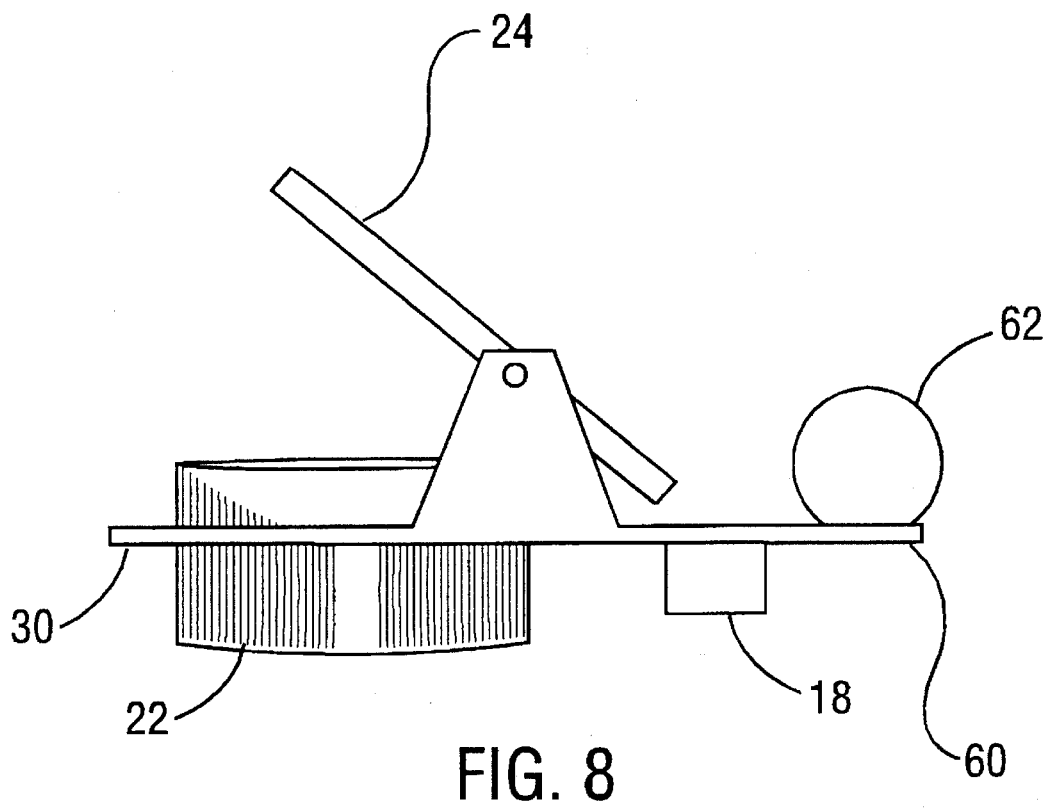
FIG. 8 is a side elevation view of yet another embodiment, employing a counterweight positioned on the head structure to move the center of gravity of the head closer to the support arm.

Referring to FIG. 8, an alternative method for reducing vibration of an overhead projector image, particularly when using a LCD panel on the projector, is to add a rearward extension 60 to head bracket 30 and to place counterweight 62 on said rearward extension. Because counterweight 62 is located behind support arm 18, it tends to counterbalance the weight of lens 22 and the other components that are in front of support arm 18, thus moving the center of gravity of the head assembly rearward toward support arm 18. By moving the center of gravity the moments of inertia and the vibrational modes of the head assembly are altered. It will be apparent to one skilled in the art having the benefit of this description that an appropriate counterweight can be selected and positioned to eliminate or reduce resonant vibration problems in the projector head.

EXAMPLE

Tests have been performed to compare the performance of a typical overhead projector known in the prior art with the performance of a projector employing the improvements of the present invention. In objective tests, the vibration of the projection mirror was measured using an accelerometer. Two 3M M9800 projectors were used with a M6150 LCD projection panel. Accelerometer tests were performed using a standard projection head (as shown in FIG. 1) and two split-head assemblies (as shown in FIGS. 3 and 4). The results of those tests are shown in the following table:

| Projector | Head | Vibration (g) |
| --- | --- | --- |
| A | Standard | 7.50 |
| A | Split #1 | 1.75 |
| A | Split #2 | 0.75 |
| B | Standard | 5.75 |
| B | Split #1 | 2.00 |
| B | Split #2 | 1.00 |

It can be seen that the split-head design of the present invention provided a substantial decrease in the measured vibration of the projection mirror. Additional subjective tests based on observation of the vibration of the projected image have been consistent with these objective results, showing that the novel split-head design solves the problem of image vibration when a LCD panel causes unacceptable vibration when used with an overhead projector.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

We claim:

1. An overhead projector including a base, a head supporting arm attached to the base, and an improved projection head attached to the head supporting arm, the projection head comprising:

a generally horizontal mounting plate having a front edge and a rear edge attached to the head supporting arm near the rear edge of the mounting plate in a cantilevered fashion;

a head bracket adapted to support a projection lens and a projection mirror, the head bracket having a front edge, a rear edge, and a transverse centerline approximately midway between the front edge and the rear edge;

wherein the head bracket is attached to the mounting plate by fasteners and rigid spacers are disposed between the mounting plate and the head bracket proximate each fastener;

the fasteners being positioned near the front edge of the mounting plate and near the centerline of the head bracket.

2. An improved projection head for attachment to a head supporting arm of an overhead projector, comprising: a generally horizontal mounting plate securely attached to the head supporting arm in a cantilevered fashion; a head bracket adapted to support a projection lens and a projection mirror; the head bracket being attached to the mounting plate, wherein the point of attachment between the mounting plate and the head bracket is spaced from the arm; and a head cover attached to the head bracket.

3. The projection head of claim 2, wherein the head bracket is spaced from the mounting plate by spacers positioned between the head bracket and the mounting plate.

4. The projection head of claim 3, wherein the spacers are formed from a rigid material.

5. The projection head of claim 3, wherein the spacers are formed from a resilient material.

6. The projection head of claim 2, further comprising a travel limiting tab positioned to loosely couple the head bracket and the mounting plate and a dampening pad disposed between the head bracket and the mounting plate.

7. An overhead projector comprising a projection head as recited in claim 2.

8. An improved overhead projector having a head assembly mounted in a cantilevered fashion to a head support arm, the head assembly including a head bracket that supports a projection lens and a mirror, wherein the improvement comprises: a generally planar and horizontal mounting plate positioned between the head support arm and the head bracket, the mounting plate being attached to the head support arm in a cantilevered fashion near a rear edge of the mounting plate, and the head bracket being attached to and supported by the mounting plate at a position spaced from the head support arm.

9. The improvement of claim 8, wherein a lower surface of the head bracket is spaced from an upper surface of the mounting plate by spacers positioned between the head bracket and the mounting plate.

10. The improvement of claim 9, wherein the spacers are formed from a rigid material.

11. The improvement of claim 9, wherein the spacers are formed from a resilient material.

12. The projection head of claim 8, further comprising a travel limiting tab positioned to loosely couple the head bracket and the mounting plate and a dampening pad disposed between the head bracket and the mounting plate.

13. A projection head for an overhead projector having a support arm for supporting the projection head, comprising:

a lens bracket coupled to the support arm and adapted to hold a projection lens;

a mirror bracket adapted to hold a projection mirror, the mirror bracket being resiliently coupled to the lens bracket;

a damping material disposed between the lens bracket and the mirror bracket to isolate the mirror bracket from vibration of other parts of the projector.

14. The projection head of claim 13, wherein the lens bracket is directly attached to the support arm.

15. The projection head of claim 13, further comprising a mounting plate, wherein the mounting plate is attached to the support arm and the lens bracket is attached to the mounting plate.

16. An improved projection head for attachment to a head supporting arm of an overhead projector, comprising: a head bracket adapted to support a projection lens and a projection mirror, the lens and the mirror being positioned in from of the supporting arm; a rearwardly extending portion of the head bracket located behind the support arm; and a counterweight attached to the rearwardly extending portion of the head bracket.

* * * * *

UNITED STATES PATENT AND TRADEMARK OFFICE
CERTIFICATE OF CORRECTION

PATENT NO. : 5,465,127
DATED : November 7, 1995
INVENTOR(S) : Dwight G. Baldwin, Xiaowei Zhao, Mike E. Darland, and Ernesto M. Rodriguez It is certified that error appears in the above-indentified patent and that said Letters Patent is hereby corrected as shown below:

Column 1, Line 17, "focussing" should read --focusing--.

Column 2, Line 1, "maimer" should read --manner--.

Column 2, Line 46, "from" should read --front--.

Column 4, Line 18, "emobidments" should read --embodiments--.

Column 7, Line 2, "from" should read --front--.

Signed and Sealed this

Twelfth Day of November, 1996

Attest:

BRUCE LEHMAN

Attesting Officer  Commissioner of Patents and Trademarks